June 20, 1961  W. V. GOODHUE  2,988,963
AUTOMATIC FEED MECHANISMS
Filed April 11, 1946  7 Sheets-Sheet 2
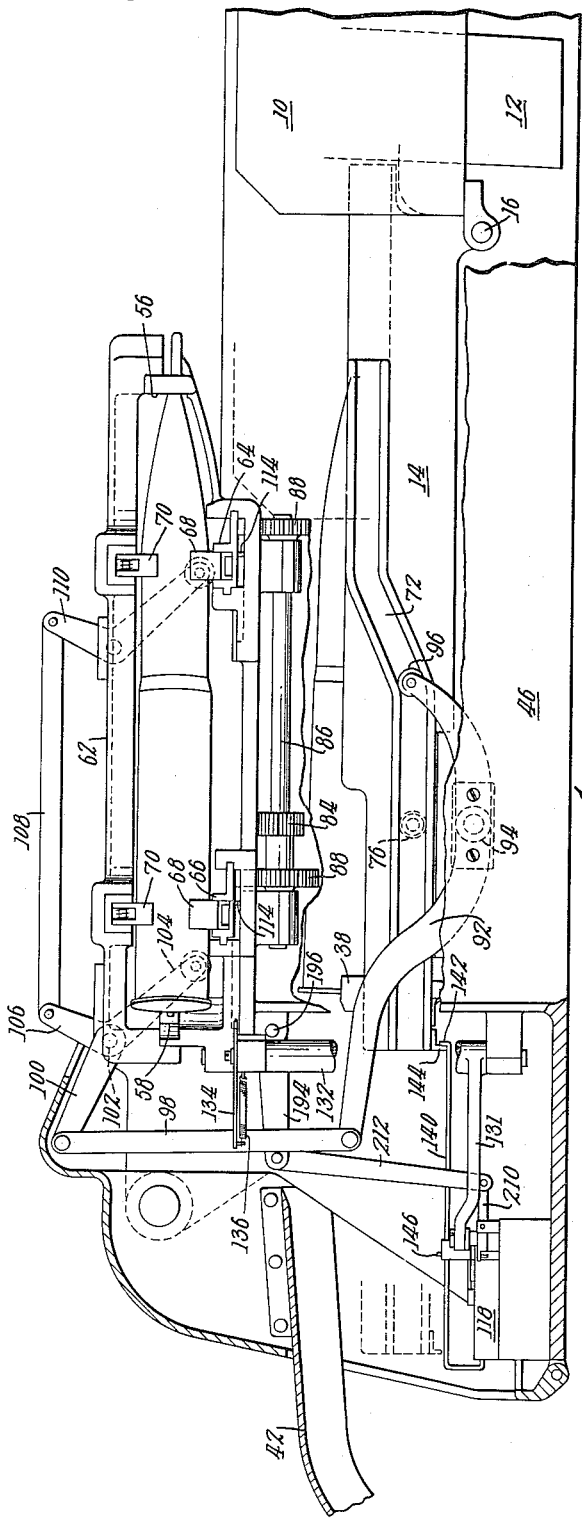
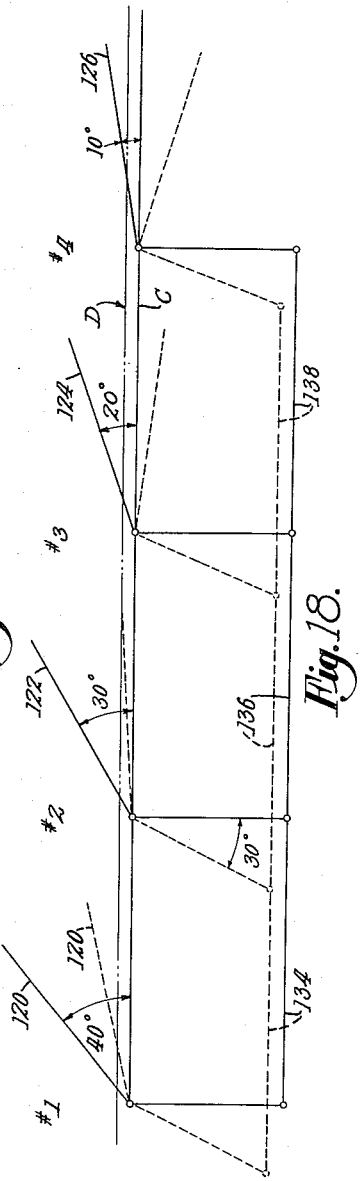
Inventor
William V. Goodhue
By his Attorney
Thomas Ryan Inventor
William V. Goodhue
By his Attorney
Thomas Ryan.

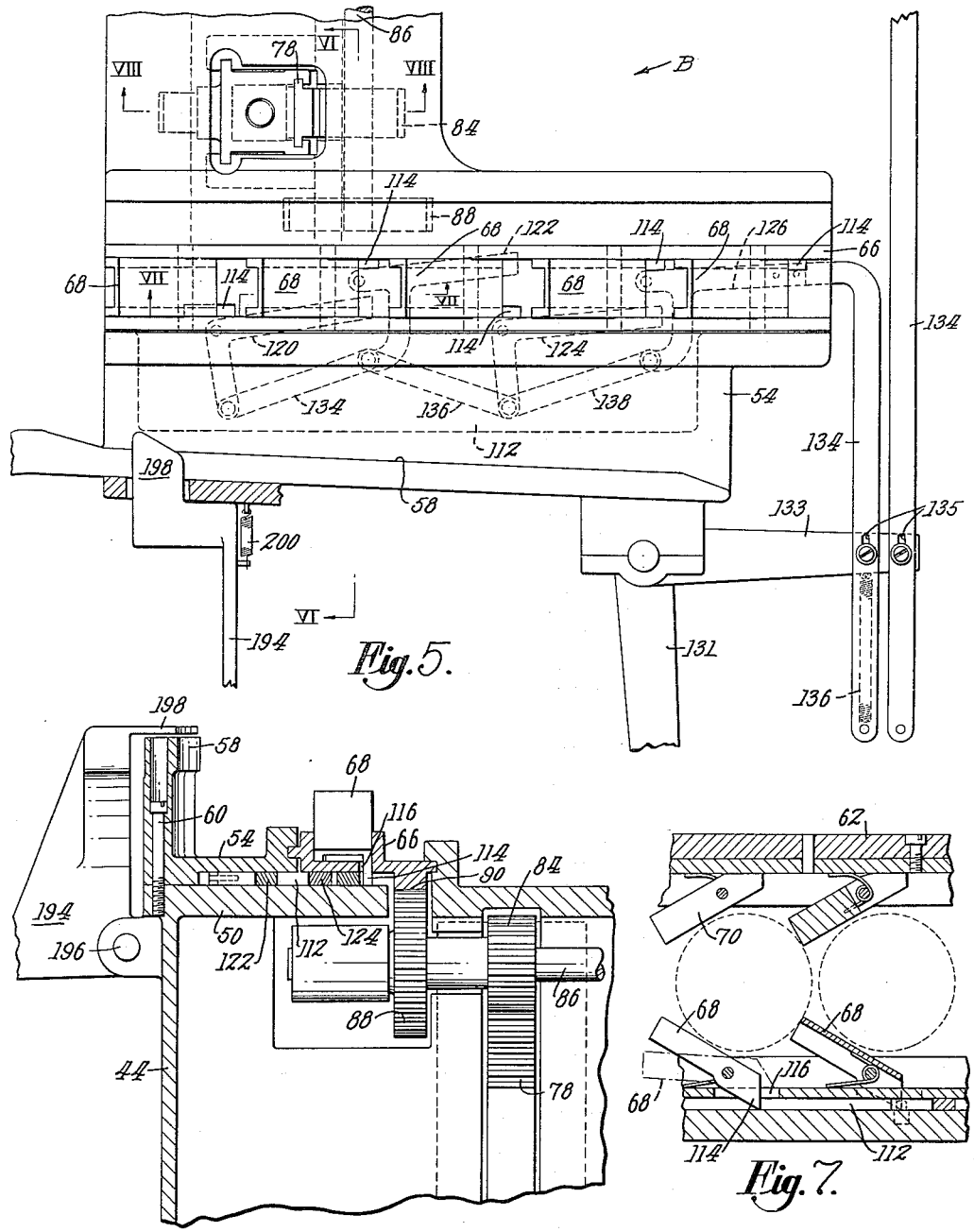

June 20, 1961 W. V. GOODHUE 2,988,963
AUTOMATIC FEED MECHANISMS
Filed April 11, 1946 7 Sheets-Sheet 5

Inventor
William V. Goodhue
By his Attorney
Thomas Ryan.

June 20, 1961 W. V. GOODHUE 2,988,963
AUTOMATIC FEED MECHANISMS
Filed April 11, 1946 7 Sheets-Sheet 6
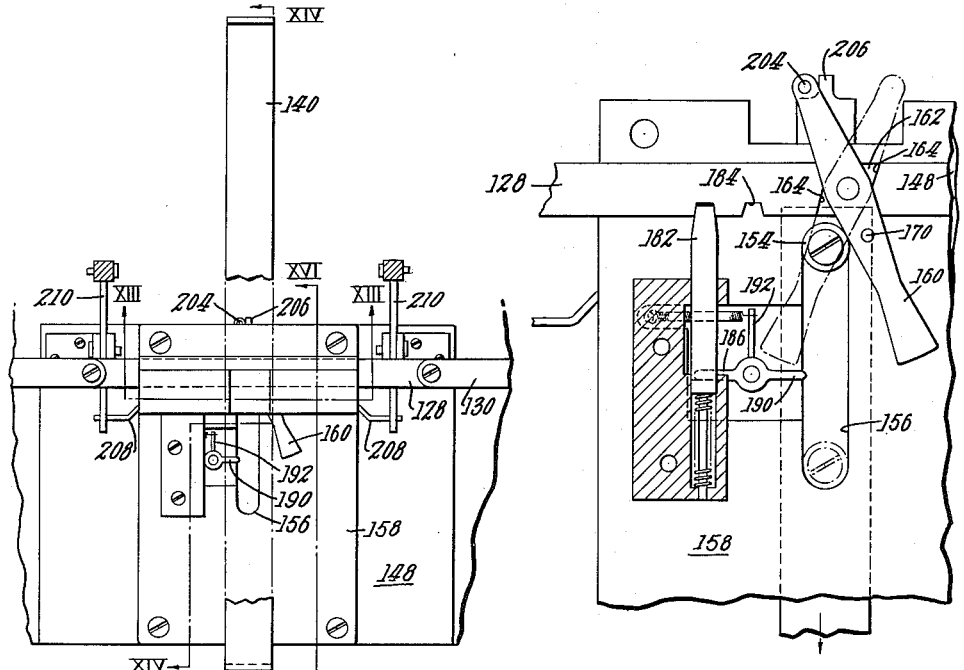
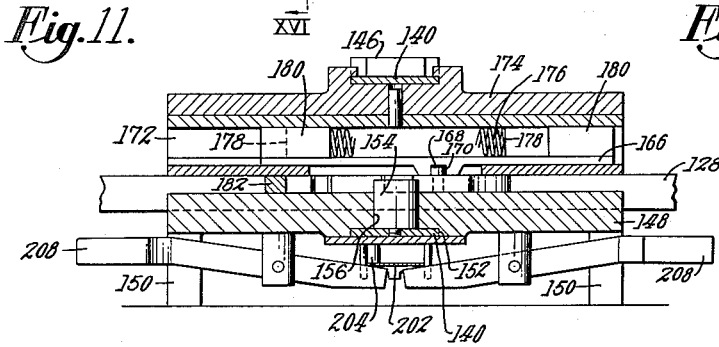
Inventor
William V. Goodhue
By his Attorney
Thomas Ryan June 20, 1961 W. V. GOODHUE 2,988,963
AUTOMATIC FEED MECHANISMS
Filed April 11, 1946 7 Sheets-Sheet 7

Inventor
William V. Goodhue
By his Attorney
Thomas Ryan

United States Patent Office 2,988,963
Patented June 20, 1961

2,988,963
AUTOMATIC FEED MECHANISMS
William V. Goodhue, Ipswich, Mass., assignor to United Shoe Machinery Corporation, Flemington, N.J., a corporation of New Jersey
Filed Apr. 11, 1946, Ser. No. 661,377
6 Claims. (Cl. 89—33)

This invention relates to automatic feed mechanisms and is herein illustrated by way of example as applied to a 40 mm. antiaircraft gun of the Bofors type.

It is an object of this invention to provide an improved automatic feed mechanism arranged to receive shells from a plurality of sources and alternately to present shells from each source to a loading station, the mechanism having means for causing the repeated presentation of shells from one source to the loading station in the event of an interruption in the supply from the other source. As illustrated, the feeding mechanism comprises a plurality of magazines, feed slides associated with each magazine and means for controlling the operating cycles of the feed slides so that shells are presented to the loading station alternately from the different magazines unless there is no shell available for loading in one magazine in which case the frequency of the operating cycles of the feed slide associated with the other magazine is increased.

It is a further object of this invention to provide an improved automatic feed mechanism arranged simultaneously to handle a plurality of work pieces and progressively to move them to a work station, the feed mechanism being adapted to accelerate the feed of work pieces received after an interruption in loading to the end that blank spaces in the progression of the work pieces due to the interruption in the loading will be eliminated and an uninterrupted succession of work pieces be presented to the work station. As illustrated, this feature of the improved mechanism comprises a feed slide having pawls which move a plurality of shells progressively from a shell receiving station to a gun loading station and controls for the pawls which render the pawls inoperative during certain operating cycles, the arrangement of the controls being such that upon the occurrence of a gap in the succession of shells, the pawls between the gap and the receiving station are continuously operative causing an acceleration in the feeding rate of shells back of the gap until the gap has been eliminated.

Invention is also to be recognized in the means for alternating the operation of the feed slides associated with the different magazines which causes the alternate presentation of shells to the loading station and also in the sensing means for determining the absence from a magazine of a round adjacent to the loading position and the mechanism controlled by the sensing means which is called into operation under this condition for causing the repeated and uninterrupted feed from the other magazine.

With the above and other objects in view, the invention will now be described in connection with the accompanying drawings and thereafter pointed out in the claims.

In the drawings,

FIG. 2 is a side elevation of the feed mechanism showing its relation to the breech ring and loading tray of the gun;

FIG. 5 is a plan view of the magazine on the right side of FIG. 1 with the cover plate and shells removed showing details of the feed pawls and the control system for those pawls;

FIG. 6 is a section on line VI—VI of FIG. 5;

FIG. 7 is an enlarged view taken along line VII—VII of FIG. 5, showing details of the shell-feeding and holding pawls;

FIG. 11 is a plan view of the feed alternator;

FIG. 12 is a plan view similar to FIG. 11 with the cover plates removed to show the details of the selector slide and its operating mechanism;

FIG. 13 is a vertical section of the feed alternator taken along line XIII—XIII of FIG. 11;

FIG. 14 is a vertical sectional view of the feed alternator taken along line XIV—XIV of FIG. 11;

FIG. 18 is a diagrammatic sketch illustrating the operating principle of the feed pawl control system.

Figure 3:
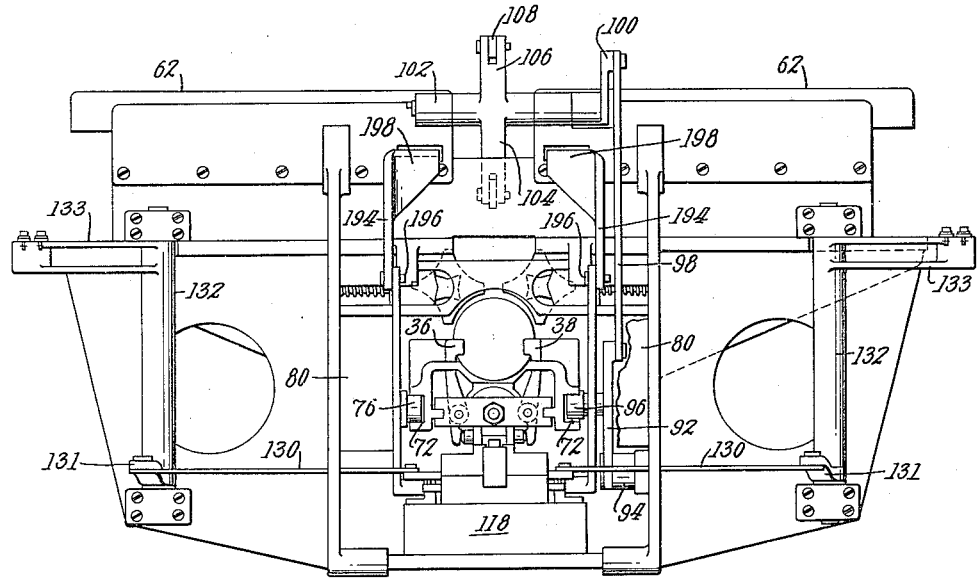
FIG. 3 is an end view taken from the rear of the gun, certain parts being broken away to disclose other parts.
Figure 9:
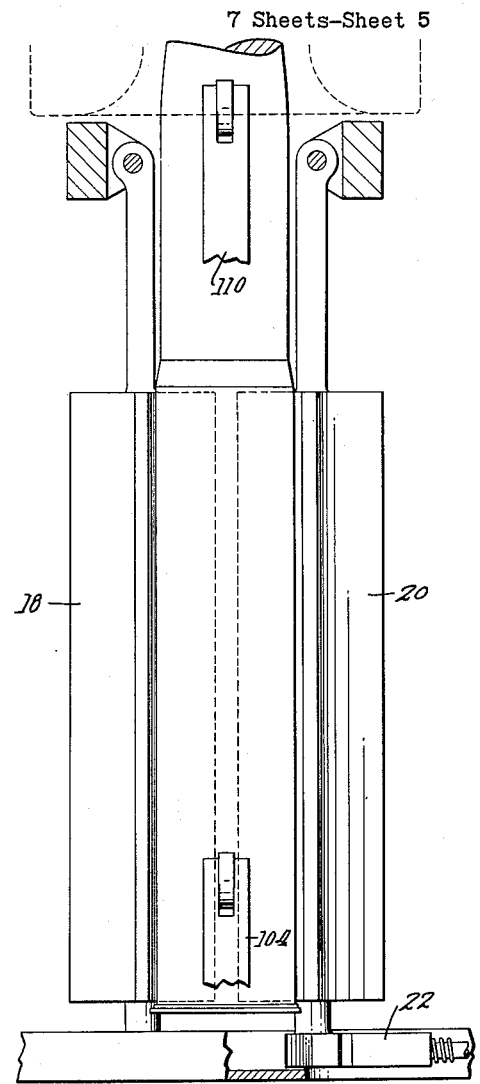
FIG. 9 is a section on line IX—IX of FIG. 4, showing details of the feed roll assembly.
Figure 10:
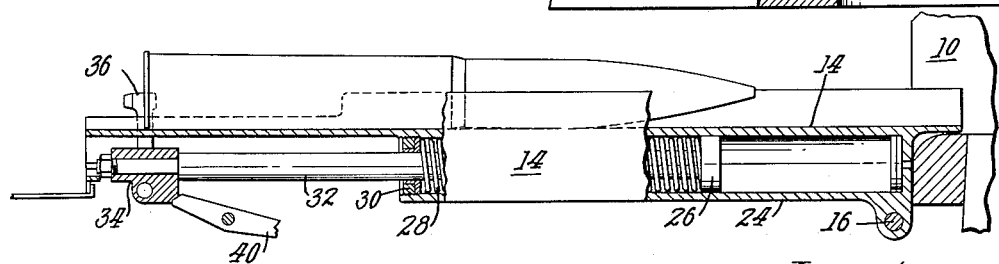
FIG. 10 is an elevation taken along lines X—X of FIG. 4, partly broken away to show the relationship between the breech ring, loading tray and cocking mechanism.
Figure 15:
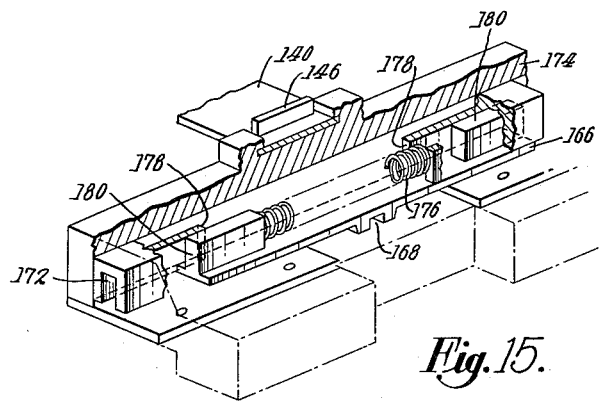
FIG. 15 is a perspective view, partly broken away, of the spring biased centering means for the selector slide cam.

The automatic feed mechanism of the present invention is herein shown as applied to a Bofors gun, of the type illustrated in British Patent No. 398,081, accepted September 7, 1933, and is located generally to the rear of and above the loading tray for the gun. The relation between the automatic feed mechanism and the conventional gun structure can best be seen by reference to FIGS. 2 and 4, and for purpose of orientation, the conventional gun structure will first be described. In the drawings 10 indicates the breech ring, 12 the breech block and 14 a loading tray which is fastened to the breech ring by a bolt 16 and thus partakes in the recoil movement of the breech mechanism. Located above the loading tray are star shaped rolls 18 and 20 which carry the next round to be loaded when the gun returns to battery after firing. The rolls 18 and 20 are forced toward each other by spring-pressed blocks 22 (FIG. 9) which yield outwardly when pressure is exerted on the shell resting on the rolls to permit that shell to drop into the loading tray. Located on the under side of the loading tray 14 (FIG. 10) is a cylinder 24 which houses a piston 26 that is urged to the right as viewed in FIG. 10 by a spring 28 which is held in the cylinder by a locking ring 30. Connected to the piston 26 is a rammer rod 32 which has fastened to its opposite end a member 34 to which is pivotally connected a pair of rammer arms 36, 38 (FIG. 3). The structure so far described is old and functions in the following manner. Upon firing, the gun recoils moving the breech ring 10 and loading tray 14 rearwardly ejecting the empty shell casing through the loading tray and out beneath a casing deflector 42 (FIG. 2). Upon counter-recoil the breech ring and loading tray move back to battery position, but the rammer is held back by a rammer release lever 40 (FIG. 10) thereby loading spring 28. When a shell is moved down onto the loading tray and the rammer release lever 40 tripped, the spring 28 moves the rammer rod rapidly to the right carrying the shell with it until the point is reached where the rammer arms 36, 38 are moved out of engagement with the flange on the shell casing allowing the momentum of the shell to carry it into the chamber of the gun.

Figure 4:
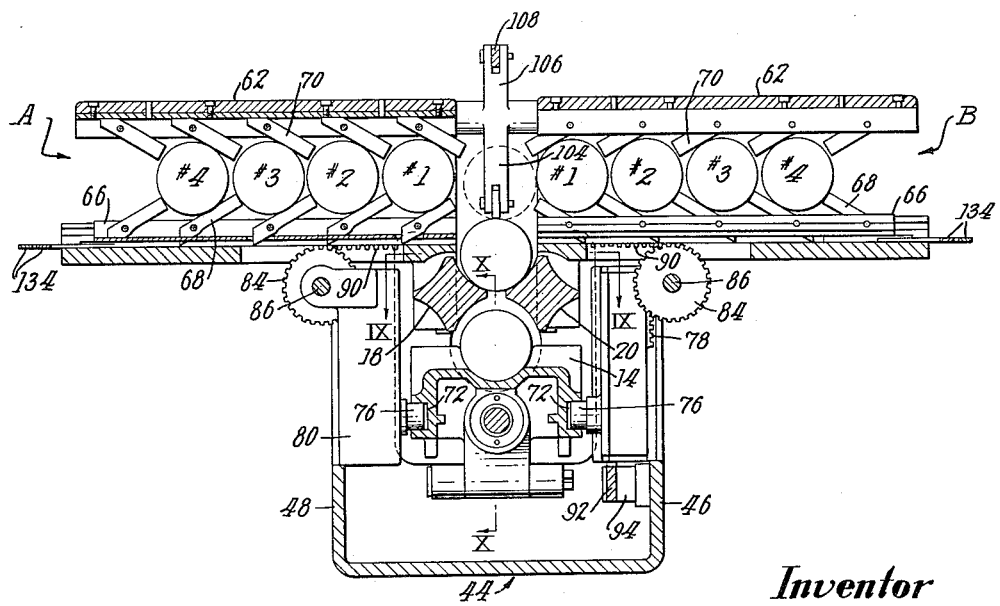
FIG. 4 is a section on line IV—IV of FIG. 1, looking in the direction of the arrows.

Applicant's automatic feed mechanism is mounted in a housing having a U-shaped base 44 (FIG. 4) with upstanding sides 46 and 48 and an H-shaped top 50. As can best be seen in FIG. 1, the top 50 forms the underside of two magazines A and B which are located on opposite sides of the gun where they can be fed by different gunners. Each magazine holds four shells disposed generally parallel to the axis of the gun, the shell positions being designated as #1, 2, 3 and 4 (FIG. 4). The ends of the magazines are closed by angular end members 52, 54 having upstanding opposing faces 56, 58 which form guides for shells in the magazine, the end members 52, 54 being secured to the top 50 by screws 60 (FIG. 6). The top of the magazine is formed by closure plates 62 (FIG. 1) having recesses in their mid portions which permit the gunner's hand to extend partly into the magazine to facilitate insertion of shells. The adjacent sides of the magazines are located above the rolls 18, 20 (FIG. 4) and are separated a distance slightly greater than the diameter of a shell so that shells which are fed from the magazines are located in the vertical plane of the gun for movement downwardly into ramming position by a vertical feed mechanism which will subsequently be described.

Figure 1:
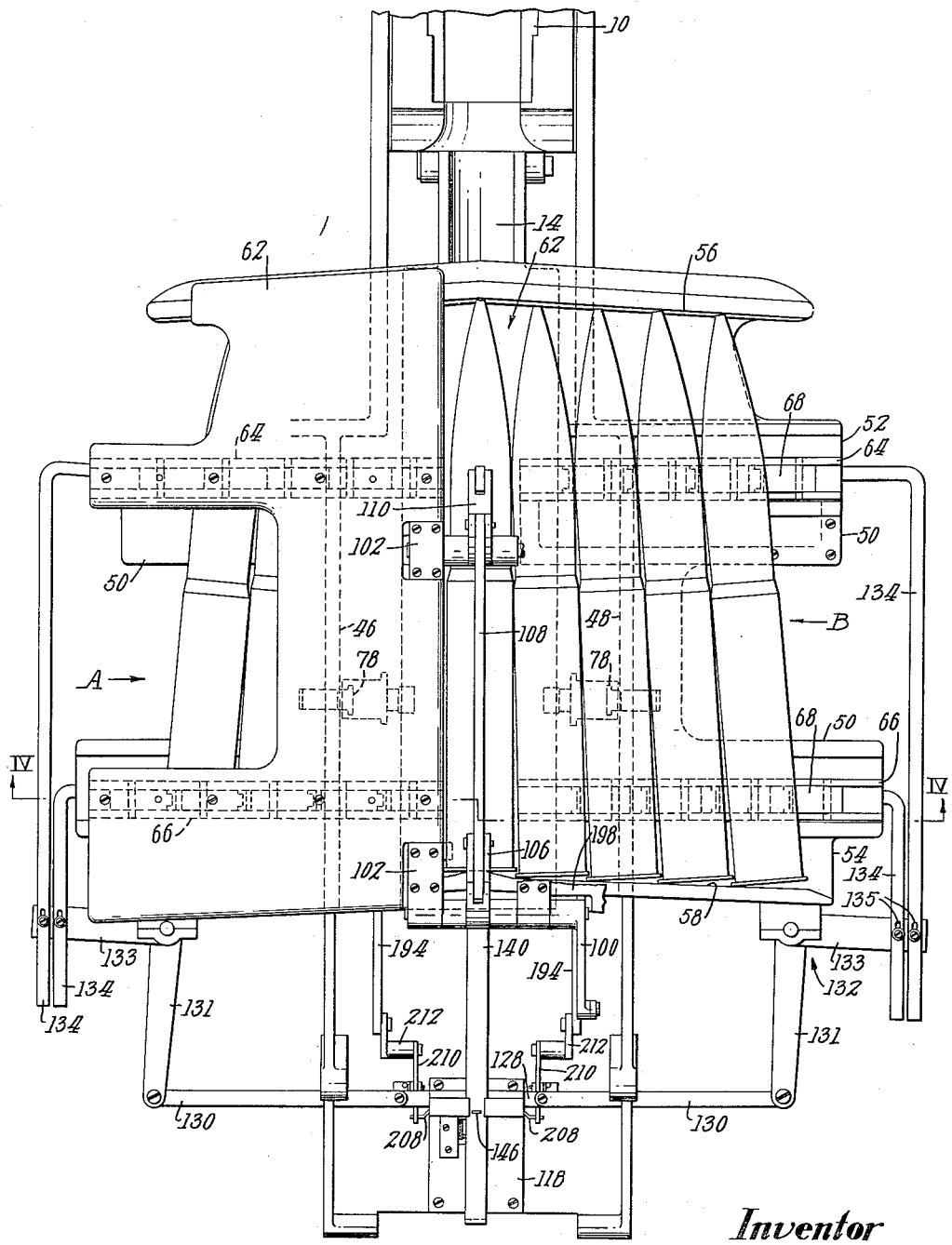
FIG. 1 is a top plan view of an automatic feed mechanism in which the present invention is embodied, showing the magazine on the right with the top cover plate removed.

Shells are fed inwardly through the magazines by indexing mechanisms which are the same for each magazine, so for the sake of brevity only the indexing mechanism of magazine B will be described; however, similar parts in each magazine will be given like numerals. Referring to FIG. 1 it will be seen that the indexing mechanism consists of reciprocating slides 64, 66 located adjacent to the ends of the magazine where they operate respectively upon the nose and the base of shells in the magazine. Each of the slides has pivoted thereto a number of feed pawls 68 (FIG. 4) which pass under shells in the magazine when the slide is retracted and which feed the shells forward one position when the slide is moved forward. Shells in the magazine are prevented from moving backward when the feed slide is retracted by pawls 70 which are located above the slides where they are pivoted to the underside of the closure plate 62.

Figure 8:
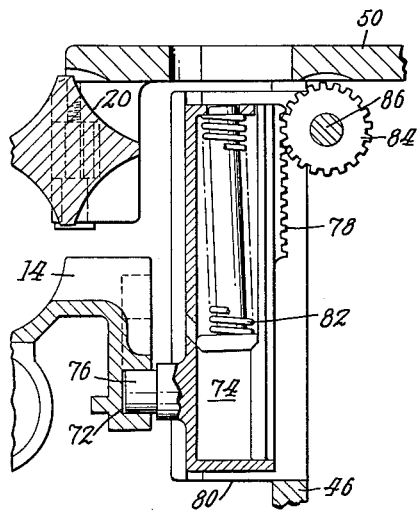
FIG. 8 is a section on line VIII—VIII of FIG. 5.

The indexing mechanism and the vertical feed are operated by energy supplied by the recoil of the gun, power being taken off cam tracks 72 formed on the sides of the loading tray 14. The operating system for the indexing mechanism consists of a hollow block 74 having a cam roll 76 projecting into cam track 72 (FIG. 8), the block 74 being slidably received in guides 80 that extend inwardly from the side wall 46, said block in turn receiving a rack 78 slidably mounted in the open side thereof. The block 74 is coupled to the rack 78 by a spring-biased plunger 82 that is automatically cammed to one side to disconnect the rack from the block in case a shell jams in the feeding movement. The rack 78 is connected to the slides 64, 66 through a gear 84 which is fast to a shaft 86 that is parallel to the axis of the gun and is located below the magazine underside 50, the shaft 86 carrying gears 88 (FIG. 2) which mesh with racks 90 on the underside of the slides. The cam track 72 has an offset portion which causes heightwise displacement of the cam roll 76 and hence backward and forward movements of the slides 64, 66 at predetermined times during the recoil and counter-recoil movements of the gun.

Also operated by the cam track 72 is the vertical feed which forces the shell between the magazines downwardly on to the rolls 18, 20 with a consequent downward movement of the underlying shell which had been on those rolls to the loading tray. This vertical feed consists of a lever 92 pivoted between its ends at 94 to the side wall 46, the lever carrying at one end a cam roll 96 extending into the cam track 72 and having its other end connected to an upwardly extending link 98. The opposite end of the link 98 is connected to an arm 100 of a three arm lever pivoted at 102 to the ends of the magazines, a second arm 104 of the lever engaging the top of a shell between the magazines and the third arm 106 being connected to a forwardly extending link 108 which acts through a second lever 110 also pivoted between the magazines to apply a downward push to the nose of the shell. Thus when the loading tray 14 moves forward on the counter-recoil stroke the cam 72 causes the lever 92 to swing in a clockwise direction (FIG. 2) lifting the link 98 and rotating levers 100 and 110 in a clockwise direction thereby forcing the shell which had been ejected from one of the magazines and is now between the magazines downwardly onto the rolls 18, 20 the shell which had been on those rolls being thereby forced down onto the loading tray by the pressure of the first-named shell upon it.

Inasmuch as the indexing mechanisms of both magazines take their drive from cam tracks 72 on the sides of the loading tray 14, the slides 64, 66 in each of the magazines will move simultaneously away from each other on recoil and toward each other on counter-recoil thus completing an operating cycle each time the gun is fired. There will now be described a control system for the feed pawls carried by the slides which renders the pawls on one set of slides inoperative on alternate cycles, when the magazines are fully loaded, so that shells are fed into the space between the magazines alternately first from one magazine and then from the other magazine. As the control system associated with each slide is the same, a typical arrangement will be described in connection with slide 66. Referring to FIG. 6, it will be seen that there is a chamber 112 formed under the slide 66 by offsetting the undersurfaces of the end member 54 and slide 66 from the housing top 50. The feed pawls 68 are provided with tails 114 which extend down into the chamber 112 through openings 116 in the slide when the pawls are up in their feed position. The tails are moved out of the chamber when the pawls are laid flat upon movement under overlying shells (FIG. 7) which occurs when the slide is retracted prior to its feed stroke.

Mounted in the chamber 112 is a pawl control system consisting of latches 120, 122, 124 and 126 (FIG. 5) for controlling the position of the pawls, and links 134, 136, 138 which connect the latches together, the latches being movable between the position shown in FIG. 5 where they render the feed pawls ineffective during an operating cycle, and an out-of-the-way position where they do not affect the functioning of the pawls. Each latch is pivoted adjacent to the tail 114 of a feed pawl when the slide is in its rest position and has an arm which is somewhat longer than the distance between pivots and which extends into the path of travel of the feed pawl tail when positioned as shown in FIG. 5. Assuming the control system to be located as shown in FIG. 5, when the slide 66 is moved backward upon recoil of the gun, the feed pawls will be cammed flat as they pass beneath the shells which overlie them. As the backward movement of the slide continues and the feed pawls pass the low point of the shells, the pawl tails will overlie their associated latch arms and will be held flat in an inoperative position by the latch arm which prevents the pawl tails return into the chamber. As the extent of travel of the slide is less than the distance between the latch pivots, the pawl tails will ride on the latch arms during the remainder of the recoil stroke and on the feed stroke until the pawls have again passed under their overlying shells when the tails will move out of engagement with the latches and drop into the chamber 112 allowing the pawls to rise.

Should there be a shell missing in one of the positions in the magazine, the shells to the rear of the missing shell will be fed during the otherwise inoperative feed cycle so as to fill the vacant space. This selective feeding is due to the angular relation of the latch arms to the path of travel of the feed pawl tails which makes it possible for the tail of the pawl moving through the vacant position to cam its associated latch and those behind it out of latching position, thereby permitting their associated pawls to feed on what would otherwise be an inoperative cycle. This arrangement can best be understood by reference to FIG. 18, which illustrates diagrammatically and in an exaggerated manner the angular relation of latch arms and their functioning during a selective feeding operation. In this figure 120, 122, 124 and 126 represent the latches and 134, 136 and 138 the links, C the line of latch pivots and D the path of movement of the pawl tails 114. The latches extend at angles of 40°, 30°, 20° and 10° respectively to the pawl tail path of movement D. While the latch pivots are shown in a straight line in FIG. 18 and those in FIG. 5 are staggered, the operation will be the same for each system as the length of the latch arms connected to the links 134, 136 and 138 shown in FIG. 18 is the same for each of the latches, as is the case of the latches in FIG. 5, and hence the angular travel of each latch will be the same. Now assume that the shell in position #2 is missing and the slide starts moving to the right, as viewed in FIG. 18, on its inoperative cycle. The feed pawl 68 associated with the shell in position #1 will strike the shell and be cammed flat as described in the foregoing. However, the feed pawl moving through the vacant #2 position will remain upright and its tail 114 will remain in the chamber 112, strike the side of latch 122 and cam it out of the way as the slide moves to the right and rotate it through approximately an angle of 30°. As latch 122 is connected to each of the other latches by links 134, 136 and 138 they will be likewise moved. This movement will rotate latches 124 and 126, which extend at angles of 20° and 10° to the line of pawl tail travel D, beyond that line allowing the pawl tails of the feed pawls associated with shells in #3 and #4 positions to descend into the chamber 112 and the pawls to engage the backs of those shells and feed them forward to positions #2 and #3 upon the feed stroke of the slide. However, latch 120 which extends at a greater angle to the line of pawl tail travel than latch 122 will remain under the pawl tail of the feed pawl associated with shell in position #1 and render that pawl inoperative. In a like manner the feed pawl associated with any vacant position will cam its associated latch out of its path permitting the latches behind it to feed while those in front of it will be inoperative. While an angular variation of 10° has been shown between the latches, a greater or smaller variation can be used.

When the magazines are fully loaded, the latches are moved out of the path of feed pawl tails in the different magazines on alternate operating cycles by a shift bar 128 in a feed alternator 118 (FIG. 1). The shift bar is connected to the latches by a linkage system consisting of a link 130 pinned to the lower arm 131 of a crank 132, the crank being pivoted to a corner of the housing and having an arm 133 located substantially in the plane of the chamber 112. The crank arm 133 is connected to latch 126 by an L-shaped link 134 the bent end of which projects into the chamber 112 (FIG. 5). A slot 135 in link 134 provides a lost-motion connection between the link 134 and crank arm 133 which allows for limited movement of the latches when the selective feeding operation described above occurs. A tension spring 136 between the link 134 and crank arm 133 normally holds one end of the slot 135 against a connecting pin but yields to permit limited relative movement between the latches and the crank arm. Similar connections are provided between the crank arm 133 and the latches underlying the feed pawls carried by slide 64 so that the latches on both slides are simultaneously and similarly controlled. A corresponding linkage system is provided between the shift bar 128 and the latches in magazine B so that when the shift bar 128 is moved to the right the feed pawls in magazine A are rendered inoperative and those in magazine B operative and when shifted to the left a reverse action occurs.

The alternator 118 which controls the operating sequence of the feed pawls is located rearwardly of and slightly below the loading tray 14 (FIG. 2), and is automatically operated by the recoil of the gun through a hook-shaped member 140. The long arm of the member 140 has an upturned end 142 which is located in the path of a downwardly extending lip 144 on the rear end of the loading tray 14, and also has a lug 146 separated from the upturned end 142 a distance slightly less than the travel of the loading tray 14 on recoil, so that upon recoil of the gun the lip 144 first strikes lug 146, moving the member 140 rearwardly, and upon counter-recoil strikes the end 142, moving the member forwardly. The motion of the member 140 causes the alternator to shift the feed between the two magazines.

The alternator is mounted on a base 148 having depending sides 150 (FIG. 13) which form a compartment beneath the base in which part of the operating mechanism is mounted. Formed in the underside of the base is a longitudinal groove 152 for the reception of the short arm of the member 140. Mounted on the end of the short arm is a roller 154 which reciprocates in a slot 156 formed in the base, the slot being slightly longer than the travel of the member 140. On the upper side of the base and extending at right angles to the groove 152 is a second groove 158 which slidably receives the shift bar 128. The shift bar is reciprocated in its slot by the member 140 through the medium of a reversible slide cam 160 which is pivoted forward of its center in a groove 162 formed in the upper surface of shift bar, the groove having V-shaped shoulders 164 which limit movement of the cam 160 in the groove. The cam 160 is moved back and forth across the top of the slot 152 by a shifting mechanism which will be described later and is engaged by the roller 154 when it is moved forward by counter-recoil of the gun. This operation can best be understood by reference to FIG. 12 which shows the shift bar in its right position with the roller 154 in engagement with the left side of the cam. When the roller 154 is moved to the rear of its slot 156 upon recoil of the gun the cam 160 is swung to its outlined position where it lies across the slot, then when the roller is moved forward upon counter-recoil the roller strikes the right side of the cam. As the cam is engaged with the shoulders of the groove 162 in the slide 128 and cannot move relatively to the slide, the entire assembly will be shifted to the left, moving the slide 128 to its left position.

The reversible slide cam 160 is swung back and forth about its pivot by a centering slide 166 which has a groove 168 that receives a pin 170 projecting upwardly from the cam. The centering slide 166 is mounted in a channel 172 formed on the underside of a housing 174 that overlies the shift bar 128. The centering slide 166 is biased toward a rest position wherein its groove 168 overlies the center line of the slot 156 by a centering spring 176 which is confined in the channel 170 by partitions 178 that extend across the channel, the spring acting on rectangular-shaped lugs 180 that extend upwardly into the channel from the ends of the centering slide. When the slide is moved to one side or the other of its rest position by the pin 170, as is the case when the cam 160 is in the position shown in FIG. 12, one of the lugs 180 passes through openings in the partition 178 and compresses the centering spring so that when the cam is again freed to move, by reason of movement of the roller 154 to the rear of its slot, the centering spring acting through the slide 166 moves the cam until the groove 168 and pin 170 overlie the slot 156. Inasmuch as the pivot point of the cam lies to one side of the center line of the slot 156 when the shift bar is in one of its operating positions the centering of the pin 170 swings the cam across the slot 152 where the roller strikes it on counter-recoil, causing movement of the shift bar 128 with the resulting alternating of the magazine feed.

The shift bar 128 is locked in one or the other of its operating positions by a spring-pressed pawl 182 which engages notches 184 in the bar. The pawl 182 is withdrawn from the notches by a three-armed lever which has one arm 186 underlying the pawl and in engagement with a pawl shoulder 188 (FIG. 14), a second arm 190 projecting a short distance over the slot 156 so that it will be engaged by the roller 154 on its forward or counter-recoil stroke and rotated in a counter-clockwise direction causing the arm 186 to engage the pawl shoulder 188 and withdraw the pawl and a third arm 192 which is spring-biased to hold the arm 186 against the pawl shoulder 188. As the pawl shoulder 188 limits the movement of the lever arm 186 only in a counter-clockwise direction the lever is free to rotate in a clockwise direction when struck by the roller 154 as it moves to the rear of the slot 156 upon recoil. The pawl 182 is operated in timed relation to the operation of the shift bar as follows. When the roller 154 moves forward in the slot 156 on counter-recoil it will first strike arm 190 of the three-armed lever causing that lever to withdraw the pawl 182 from notch 184 and as the roller continues forward it will strike the tail of the cam 160 and move the shaft bar to its left position. When the shift bar reaches that position the pawl 182 will drop into the associated notch 184 again locking the shift bar in position.

Figure 16:
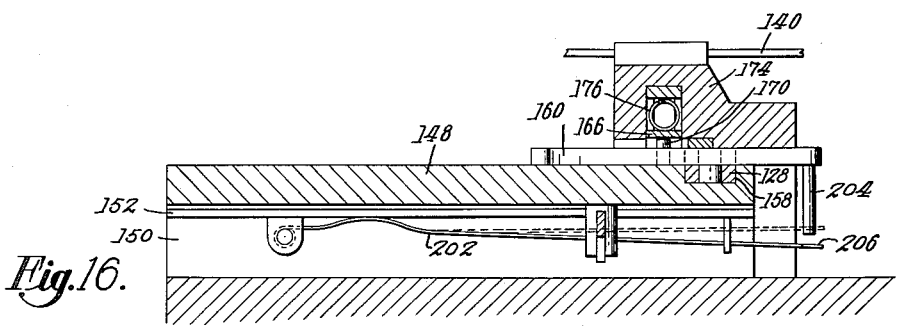
FIG. 16 is a vertical sectional view along line XVI—XVI of FIG. 11.
Figure 17:
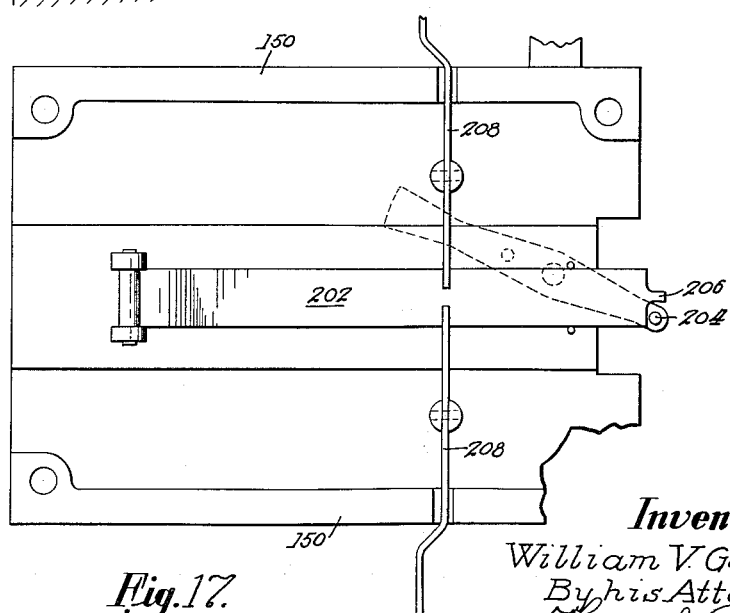
FIG. 17 is a plan view taken from a point below the feed alternator and looking upward at the under side of its housing.

As the ammunition is fed into the magazines by different gunners, it is possible that there may be an interruption in the feed from one source. To prevent a reduction in the firing rate of the gun, which would otherwise result from the interruption, sensing means are provided for sensing the #1 position in each magazine to determine the absence of a round in that position and in the event of such a condition to cause repeated and uninterrupted feeding from the other magazine. This sensing means consists of a pair of levers 194 pivoted at 196 to a lug on the end wall of the base 44 (FIG. 3) the levers having nose portions 198 which extend over the guide tracks 58 behind the #1 position and springs 200, one of which is shown in FIG. 5, which urge the levers forward so that the nose portions will project beyond the edge of the guide tracks. As long as there is a shell in the #1 position the nose 198 will be held back of the plane of the guide track by the base of the shell. However, in the absence of a shell in that position the lever will be moved forward by spring 200 until it strikes the end wall. This forward movement of the lever is utilized to operate a stop which prevents reciprocation of the shift bar 128 thereby causing the other magazine to feed each time the gun is fired. The stop consists of a flat spring 202 which is mounted in the compartment beneath the base 148 (FIG. 16), and is shaped so that it normally lies beneath a pin 204 which extends down from the end of the slide cam 160. The spring has a finger portion 206 which extends beyond the pin 204 so that when the spring is lifted to its dotted position the finger 206 will lie in the path of movement of the pin 204 and prevent rotation of the slide cam. The spring 202 can be lifted into its upper or stop position by either of a pair of levers 208 which are pivoted to the underside of the base 148 and project out beyond the sides of the base where they underlie one end of levers 210 which extend at right angles to the levers 208 (FIG. 1). The levers 210 are in turn connected by links 212 to the sensing levers 194 so that when the nose 198 of either of the sensing levers is allowed to move into the #1 position of its magazine, the resulting movement of the lever will lift the link 204, thereby operating levers 210 and 208 causing the nose of spring 202 to be moved up into the dotted position shown in FIG. 16. When the spring is in its up position the nose 206 will act as a stop to prevent the lateral movement of the shift bar 128, because when the roller 154 is withdrawn past the tail of the lever 160 the pin 204 will strike against the nose 206 and prevent the slide 166 from rotating the cam 160. As the shift bar cannot be moved, the latches in the empty magazine will be kept in their operative position shown in FIG. 5 where they render the feed pawls ineffective while the latches in the other magazine will remain in their inoperative position which will result in the feed pawls in that magazine feeding each time the gun is fired, thereby causing the uninterrupted feeding of shells from that magazine to the loading tray.

Having thus described my invention, what I claim as new and desire to secure by Letters Patent of the United States is:

1. Gun-loading mechanism comprising a plurality of magazines, feed slides in each magazine for feeding the shells to a loading station, feed pawls carried by said slides, latches arranged to render the feed pawls inoperative, and an alternator for selectively operating the latches.

2. Gun-loading mechanism comprising a plurality of magazines, shell-feeding means including feed pawls associated with each magazine, gun operated means for moving the shell-feeding means through an operating cycle each time the gun is fired, and means for rendering the feed pawls on the different shell-feeding means ineffective on alternate operating cycles.

3. Gun-loading mechanism comprising a plurality of magazines arranged to be loaded from different stations, feeding means arranged successively to move shells in the magazines toward a loading station, and sensing means associated with each of the magazines and operative upon the absence of a shell available for loading in one of the magazines for causing uninterrupted presentation of shells to the loading station from the other magazine.

4. Gun-loading mechanism comprising a plurality of magazines arranged to be loaded from different stations, feeding means arranged successively to move shells in the magazines toward a loading station, means for alternating the operation of the feeding means so that shells will be presented to the loading station from one magazine at a time, and sensing means associated with each of the magazines and operative upon the absence of a shell available for loading in one of the magazines for causing uninterrupted presentation of shells to the loading station from the other magazine.

5. An automatic feed mechanism arranged to receive a plurality of work pieces, means comprising pawls for indexing the work pieces toward a work station, latches arranged to render said pawls inoperative during predetermined operating cycles of the machine, said pawls being arranged to sense a gap caused by the absence of an associated work piece and upon the occurrence of a gap to render certain of the latches ineffective during said predetermined operating cycles thereby to accelerate the feed of the work pieces back of the gap.

6. Gun-loading mechanism comprising a plurality of magazines, gun-controlled means comprising pawls for indexing shells in the magazines toward a loading station, latches for rendering the pawls inoperative, an alternator for controlling the latches and arranged to render the pawls associated with the magazines successively inoperative and then operative on successive discharges of the gun, said pawls being arranged to sense a gap in the succession of shells and upon the occurrence of such a gap to render the latches back of the gap ineffective during the otherwise inoperative period thereby to accelerate the feed of the shells back of the gap.

References Cited in the file of this patent

UNITED STATES PATENTS

| | | |
|---|---|---|
| 924,732 | Carey | June 15, 1909 |
| 1,259,828 | Bronder | Mar. 19, 1918 |
| 1,439,825 | Kuhn et al. | Dec. 26, 1922 |
| 1,709,399 | Herlach et al. | Apr. 16, 1929 |
| 2,212,508 | Brunnhoelzl | Aug. 7, 1940 |

FOREIGN PATENTS

| | | |
|---|---|---|
| 554,835 | Germany | July 14, 1932 |
| 575,074 | Germany | Apr. 24, 1933 |
| 63,159 | Denmark | Feb. 5, 1945 |